United States Patent

Shimada

[11] Patent Number: 4,980,625
[45] Date of Patent: Dec. 25, 1990

[54] APPARATUS AND METHOD FOR SERVO CONTROL SYSTEM

[75] Inventor: Akira Shimada, Tokyo, Japan

[73] Assignee: Seiko Instruments Inc., Japan

[21] Appl. No.: 359,570

[22] Filed: Jun. 1, 1989

[30] Foreign Application Priority Data

Jun. 2, 1988 [JP] Japan .................................. 63-135928

[51] Int. Cl.$^5$ ............................................ G05B 13/00
[52] U.S. Cl. .................................... 318/568.1; 318/618; 318/629; 318/632; 364/513
[58] Field of Search ..................... 318/560–632, 318/636; 364/513, 474.29, 474.31, 474.32, 724.16, 724.19; 623/60

[56] References Cited

U.S. PATENT DOCUMENTS

| | | | |
|---|---|---|---|
| 3,872,285 | 3/1975 | Shum et al. | 318/632 X |
| 3,917,930 | 11/1975 | Davey et al. | 318/632 X |
| 3,961,234 | 6/1976 | Chambers et al. | 318/629 X |
| 4,109,189 | 8/1978 | Jacques et al. | 318/632 X |
| 4,215,298 | 7/1980 | Bigley et al. | 318/618 X |
| 4,409,531 | 10/1983 | Bjurstrom | 318/631 |
| 4,458,321 | 7/1984 | Whitney et al. | 318/561 X |
| 4,605,884 | 8/1986 | Miyagi | 318/636 X |
| 4,636,700 | 1/1987 | Moore et al. | 318/621 X |
| 4,739,230 | 4/1988 | Sonobe et al. | 318/636 X |
| 4,792,737 | 12/1988 | Goff et al. | 318/615 |

Primary Examiner—Bernard Roskoski
Assistant Examiner—Paul Ip
Attorney, Agent, or Firm—Bruce L. Adams; Van C. Wilks

[57] ABSTRACT

The present invention is provided to suppress mechanical resonance which is likely to be generated in a mechanically driven and controlled apparatus such as robots, machine tools, etc. due to their low rigidity. In order to achieve this object, the present invention uses an adaptive filter which changes its cut-off frequency or notch frequency in response to a change in the natural oscillation frequency caused by a change in position and orientation of and load acting on the machine.

16 Claims, 6 Drawing Sheets

APPARATUS AND METHOD FOR SERVO CONTROL SYSTEM

BACKGROUND OF THE INVENTION

1. Field of the Invention

The present invention relates to an apparatus and method for controlling position, speed and force of robot manipulators, machine tools, X-Y tables, etc.

2. Description of the Prior Art

In general, when a machine system is composed of only an inertial load, its frequency characteristic in relation to input torque or force, and output displacement is represented as shown in FIG. 6. A control system for the characteristic shown in FIG. 6 is easily constructed with the application of speed feedback and/or position feedback. However, when a machine system includes reduction mechanisms, support mechanisms, deflection, etc., its rigidity is low. Such a mechanical system has in many cases a frequency characteristic as shown in FIG. 7 due to the low rigidity, and consequently it is likely to generate mechanical resonance. As a countermeasure, one method is to suppress the open loop gain of the servo loop so that it does not exceed 0dB at the peak resonance. Another method is to insert a low-pass filter or a notch filter as shown in FIG. 8 at a forward transfer function of the servo loop thereby cutting the peak resonance as shown in FIG. 9.

However, the former method lowers the overall gain. Consequently, a sufficient response speed may not be obtained or the system may become vulnerable to external load disturbances. The latter method also suffers drawbacks. As shown in FIG. 10, when the natural oscillation frequency or the Q value changes as a result of a change in position and orientation of the machine system or because of change in load, a low-pass filter or a notch filter which is operative only at a fixed frequency can not eliminate the peak resonance as shown in FIG. 11.

SUMMARY OF THE INVENTION

An object of the present invention is to provide a servo control apparatus and method having an adaptive filter which changes its cut-off frequency or notch frequency in response to a change in natural oscillation frequency as shown in FIG. 12 by means of which mechanical resonance is suppressed.

When a machine system such as a robot, a machine tool, etc. is of a low rigidity, a mechanical resonance which occurs at its natural oscillation frequency may become troublesome.

Natural oscillation frequencies change in accordance with changes in position and orientation and/or load.

An adaptive filter changes its cut-off frequency or notch frequency in response to changes of the natural oscillation frequency of the machine system. Therefore a peak resonant frequency can be cut by providing a feedback loop of the machine system with an adaptive filter connected in series with the feedback loop, whereby the machine system ostensibly has a high rigidity, and its control is thus stabilized.

DETAILED DESCRIPTION OF THE PREFERRED EMBODIMENTS

Figure 1:
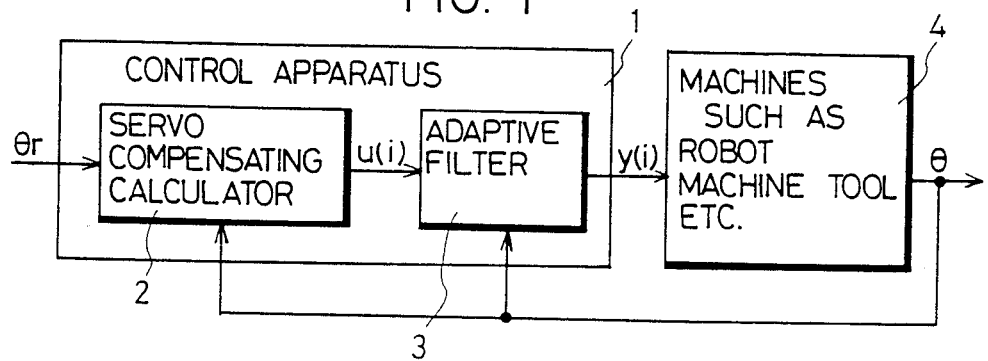
FIG. 1 schematically shows a control apparatus with an adaptive filter applied therein.

FIG. 1 shows a control apparatus 1 comprised of a servo compensating calculator 2 which receives inputs of a position command data $\theta r$ and a present position or present condition data $\theta$, and carries out a servo compensating calculation, and an adaptive filter 3 which receives the calculation results u(i) as input data and computes therefrom control output data y(i).

The control output data y(i) is fed to a machine system 4, and a corresponding movement of the machine system 4 provides an output of the present position data $\theta$.

Figure 2:
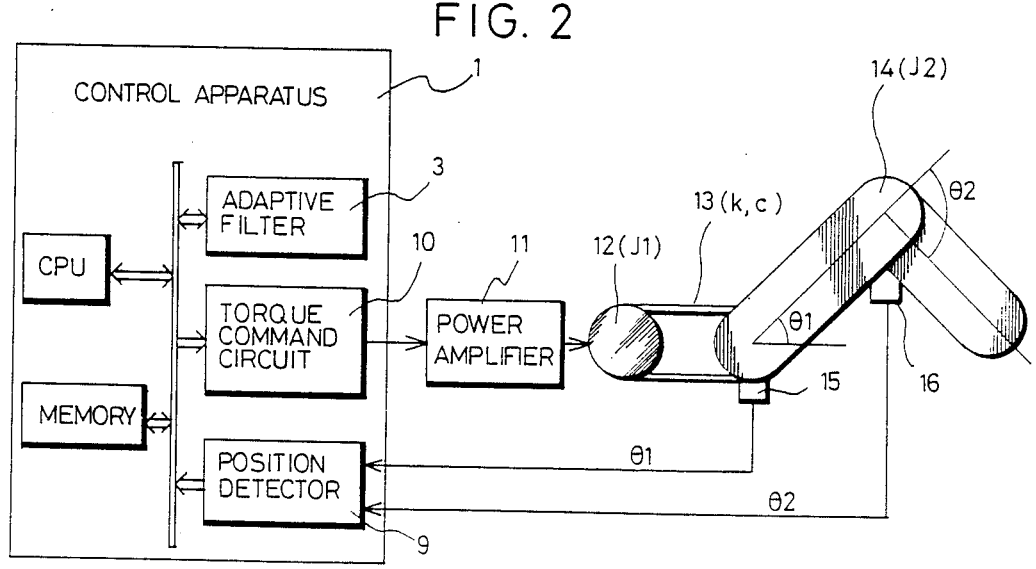
FIG. 2 is an embodiment of a two-joint type robot having a torque transmission mechanism of a low rigidity.

FIG. 2 shows an example of a two-joint robot manipulator controlled by the control apparatus 1 of FIG. 1 and using a torque transmission mechanism of a low rigidity.

In FIG. 2, the control apparatus 1 compares input position command data stored in a memory and present position or present condition data detected by a position detector 9, and carries a out servo compensating calculation. Thereafter, based on a data output of the calculation result, the control apparatus 1 carries out an adaptive filtering calculation and provides the calculation result as analog output data through a torque command circuit 10, which includes a D/A converter, to a power amplifier 11 for power amplification.

The power amplifier 11 amplifies electric drive currents to be applied to a drive motor 12 which drives the robot. The drive motor 12 provides a robot arm 14 with torques in proportion to the applied currents.

Between the motor 12 and the robot arm 14, there is provided a torque transmission mechanism 13 of a low rigidity and composed of, for example, belts, reduction gears, or other structures of low rigidity whose simplified model is represented by an elasticity constant k and a viscosity friction constant c.

Detectors 15, 16 detect the position and orientation of the robot arm 14 as angles $\theta 1$, $\theta 2$ respectively.

A transfer function GP(S) of the motor 12, the torque transmission mechanism 13 and the robot arm 14 is obtained from Equation 1, and its parameters are given by Equation 2. The natural oscillation frequency ω is defined by a ratio of the elasticity constant k to an effective inertia Je of the robot arm and the motor. The effective inertia Je consists of an inertia J1 of the motor 12 and an inertia J2 of the robot arm. J2 changes with changes in position and orientation θ2 of the robot arm. The robot arm is composed of a system which is likely to generate a mechanical resonance at this natural oscillation frequency ω. Therefore the natural oscillation frequency ω is a function of θ2.

$$GP(S) = \frac{Sc/J1J2 + k/J1J2}{S^4 + S^3c/Je + S^2k/Je} \quad \text{(equation 1)}$$

where, $Je + J1J2/(J1 + J2)$ (equation 2)

Figure 3:
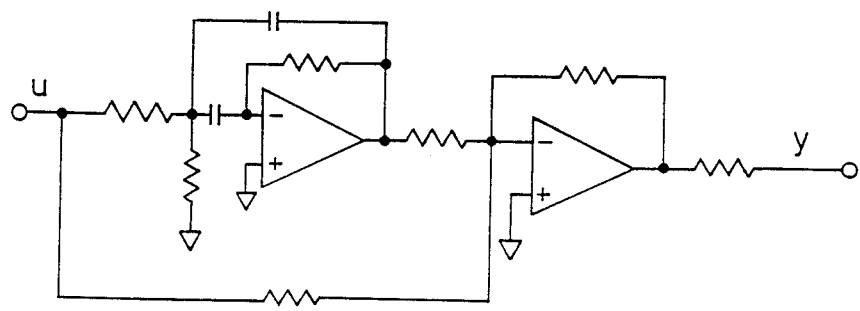
FIG. 3 shows an example of a typical analogue circuit of a notch filter.

$J1 = $ constant
$J2 = J(\theta 2) \ldots $ function of $\theta 2$
$\omega = k/Je \ldots $ function of $\theta 2$ FIG. 3 shows an embodiment of a conventional notch filter constructed with analogue circuits.

Figure 4:
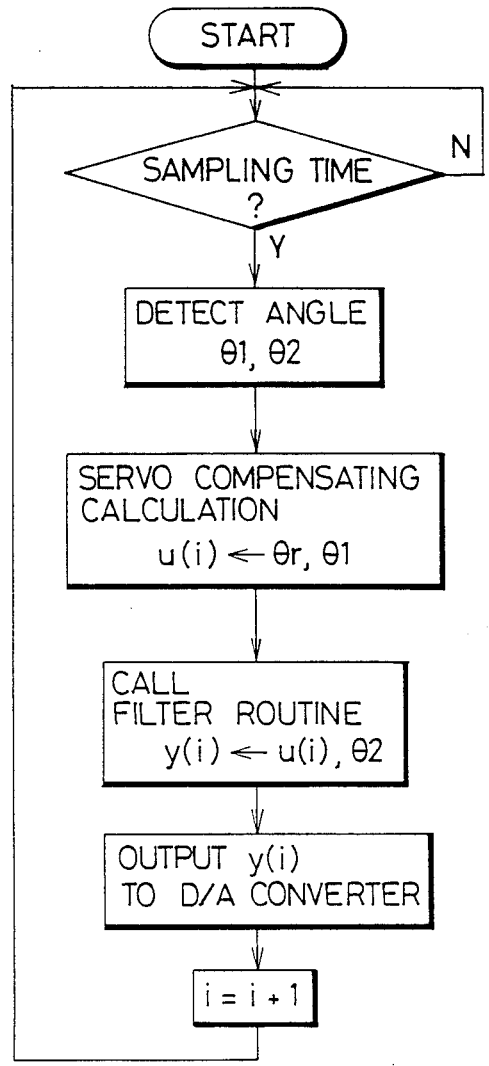
FIG. 4 and FIG. 5 show respectively the control flow and subroutine of an adaptive active filter of the invention.
Figure 5:
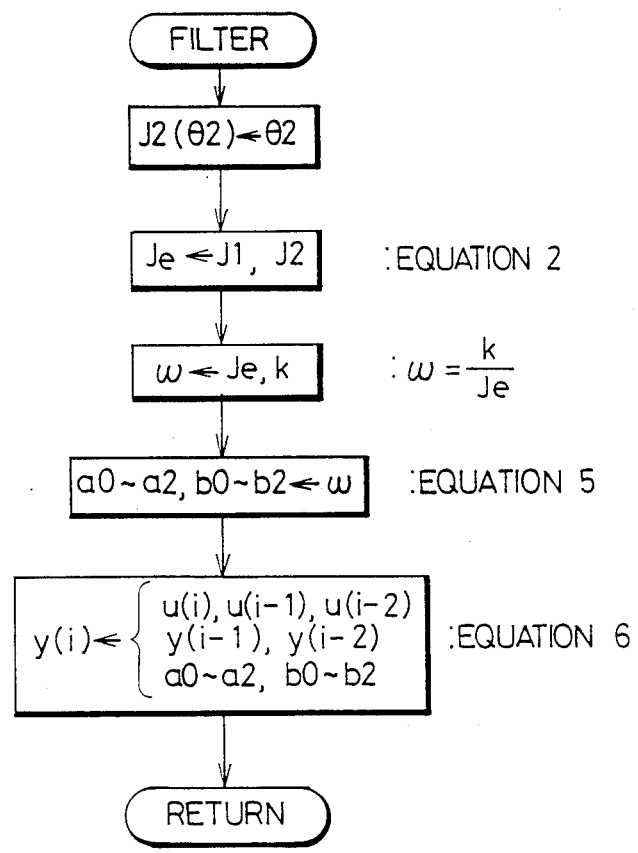
Figure 6:
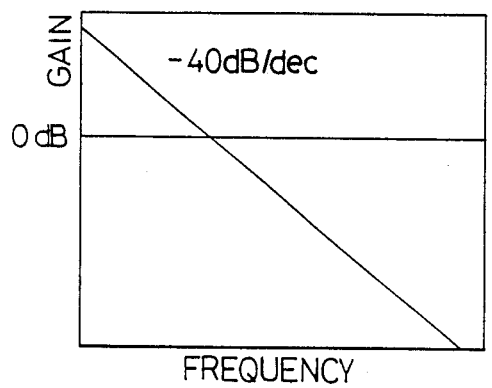
FIG. 6 shows frequency characteristics of an inertia load.
Figure 7:
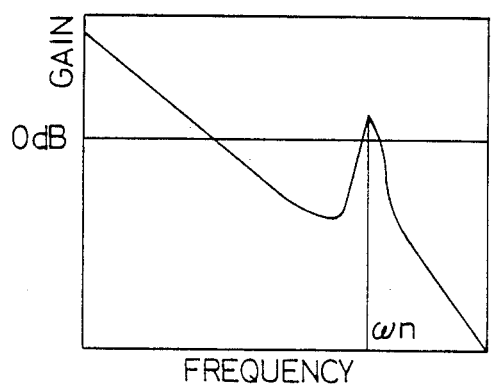
FIG. 7 shows frequency characteristics having mechanical resonance due to low rigidity of a machine system.
Figure 8:
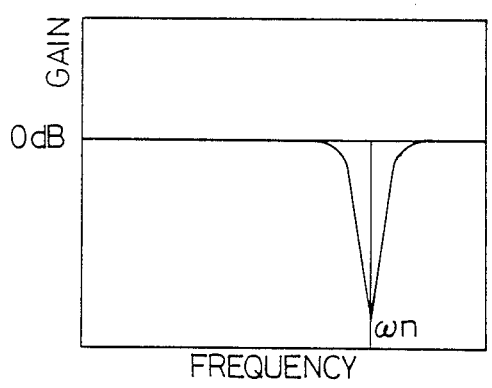
FIG. 8 shows frequency characteristics of a notch filter.
Figure 9:
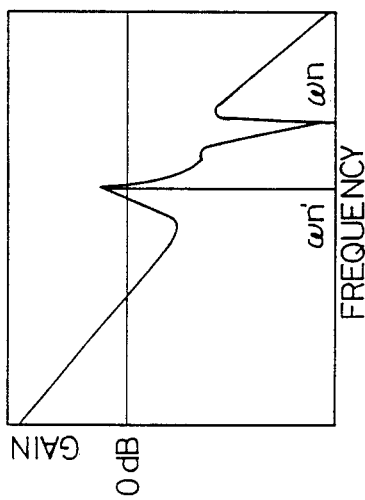
FIG. 9 shows frequency characteristics when the peak resonance of FIG. 7 is cut by the notch filter of FIG. 8.
Figure 11:
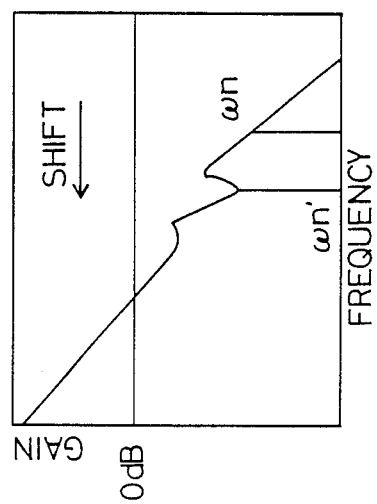
FIG. 11 shows frequency characteristics when the notch filter of FIG. 8 is applied to the shifted frequency characteristics of FIG. 10.
Figure 10:
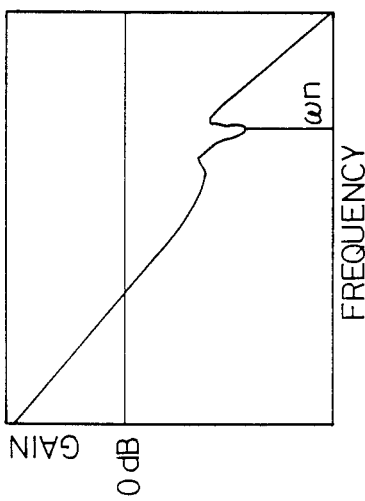
FIG. 10 shows frequency characteristics when the peak resonance of FIG. 7 is shifted as a result of a change in mechanical conditions.
Figure 12:
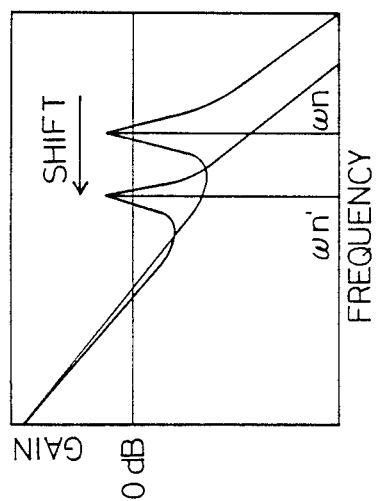
FIG. 12 shows frequency characteristics when an adaptive filter of this invention is applied to the shifted frequency characteristics of FIG. 10.

The transfer function of the notch filter is obtained by Equation 3. In accordance with the present invention, the characteristics of a notch filter (such as shown in FIG. 3) or of a low-pass filter are duplicated in the adaptive filter 3 in the form of software. For example, the adaptive filter 3 may comprise a programmed logic device, such as a ROM or a logic array, suitably programmed with instructions to carry out the subroutine shown in FIG. 5, as described hereinafter. Equation 4 is the digital transfer function of Equation 3 digitalized by bilinear transformation, and it is represented in Z transformation format. Its parameters are given by Equation 5. Equation 6 is a representation of Equation 4 in a time series expression, which has the same filtering characteristics as that of the embodiment constructed with circuits shown in FIG. 3. The characteristics of the notch filter are defined by determining the parameters in Equation 5. Namely by varying ω in Equation 5 in response to changes in position and orientation of the arm according to Equation 2, the characteristics of the notch filter can be dynamically changed.

$$G(S) = \frac{Y(S)}{U(S)} = \frac{S^2 + \omega^2}{S^2 + S \cdot \omega/Q + \omega^2} \quad \text{(Equation 3)}$$

$$G(Z) = G(S) \bigg|_{S = \frac{2}{T} \cdot \frac{1 - Z^{-1}}{1 + Z^{-1}}} = \frac{a_0 + a_1 Z^{-1} + a_2 Z^{-2}}{b_0 + b_1 Z^{-1} + b_2 Z^{-2}} \quad \text{(Equation 4)}$$

where,
$a_0 = \omega^2 + 4/T^2, b_0 = \omega^2 + 4/T^2 + 2\omega^2/QT$ (Equation 5)
$a_1 = 2\omega^2 - 8/T^2, b_1 = 2\omega^2 - 8/T^2$
$a_2 = \omega^2 + 4/T^2, b_2 = \omega^2 + 4/T^2 - 2\omega^2/QT$
$y(i) = -b_1/b_0 \cdot y(i-1) - b_2/b_0 \cdot y(i-2) +$ (Equation 6)
$a_0/b_0 \cdot u(i) + a_1/b_0 \cdot u(i-1) + a_2/b_0 \cdot u(i-2) \ (i = 0,1,2,\ldots)$ Control flow of the control apparatus 1 is shown in FIG. 4 and FIG. 5. Referring to FIG. 4, the control apparatus 1 detects present positions or conditions θ1 and θ2 of the arm 14 from the position detecting means 9 at each of predetermined sampling times, carries out servo compensating calculation, outputs the calculation results u(i) to an adaptive filtering subroutine, calculates output y(i) with input u(i) and filter coefficients, D/A converts the filter output y(i) with a D/A converter in the torque command circuit 10 and maintains the output for a time duration of $t = iT - (i+1)T$. Thereafter, the control apparatus 1 renews the counted number of sampling i, and waits for the next sampling.

FIG. 5 is a flow chart of the subroutine calculation performed by the adaptive filter 3. An inertia J2 is obtained using θ2, and then an effective inertia Je is obtained from Equation 2 using J1 and J2; thereafter the natural oscillation frequency ω is obtained using the effective inertia Je and the elasticity constant k; filter coefficients are obtained from Equation 5 using the natural oscillation frequency ω and sampling duration T; a filter output y(i) is calculated from Equation 6 using an input u(i) taken from the servo compensating calculator 2, an input u(i−1) taken at one sampling duration earlier, an input u(i−2) taken at two sampling durations earlier, an output y(i−1) taken from the adaptive filter 3 at one sampling duration earlier and an output y(i−2) taken at two sampling durations earlier; and then the operation is returned to the main control routine FIG. 4.

By the application of an adaptive active filter of the present invention to machine control systems such as robots, machine tools, etc., the adverse effects of mechanical resonance caused by the low rigidity of the systems can be controlled. In addition, it can also suppress vibrations of a gripped object which may be caused by its own low rigidity. Therefore the invention is effective in stabilizing the whole control of a machine system.

What is claimed is:

1. In combination: a machine having a mechanical resonance frequency, and a control apparatus for controlling the machine;
   the machine comprising,
   an actuator for generating mechanical power in response to output command data;
   an effector for performing a commanded work; and
   a transmitter for transmitting mechanical power from said actuator to said effector;
   wherein at least one of said actuator, said effector and said transmitter has a finite mechanical rigidity; and
   the control apparatus comprising,
   detecting means for detecting a change of mechanical condition which affects the inertia moment of the machine;
   servo compensating calculator means operative in response to input command data and output data of said detecting means for calculating and outputting a compensating result data effective to make the machine move in accordance with said input command data; and
   adaptive filter means for filtering said compensating result data to suppress frequency components close to the mechanical resonance frequency of the machine, the mechanical resonance frequency changing in dependence on the change of said inertia moment of the machine, in response to said output data of said detecting means, and outputting output command data to the machine.

2. The apparatus according to claim 1, wherein said machine comprises a robot manipulator having swingable arms, the swing angles of said arms defining said mechanical condition of the machine.

3. The apparatus according to claim 1, wherein said servo compensating calculator means comprises:
  memory means for storing a processing program of a servo compensating calculation;
  processing means for executing said processing program; and
  output means for outputting said compensating result data to said adaptive filter means.

4. The apparatus according to claim 1, wherein said adaptive filter means has the characteristics of a notch filter whose notch frequency is adaptable to match said mechanical resonance frequency of the machine.

5. The apparatus according to claim 1, wherein said adaptive filter means has the characteristics of a low-pass filter whose cut-off frequency is adaptable to match said mechanical resonance frequency of the machine.

6. A method of servo control for a machine having a mechanical resonance frequency, comprising the steps of :
  detecting a change of mechanical condition which affects the inertia moment of the machine at given sampling times;
  calculating a servo compensating result data effective to make the machine move in accordance with position data and command data in response to said detected mechanical condition and said position data and command data;
  filtering said servo compensating result data to suppress frequency components close to said mechanical resonance frequency of the machine in response to said detected mechanical condition, the filtering step comprising
    calculating an inertia moment of the machine in response to said detected mechanical condition,
    calculating the mechanical resonance frequency using the inertia moment and an elasticity constant of a transmission mechanism,
    calculating filter coefficients using the mechanical resonance frequency, and
    calculating torque command data using a plurality of servo compensating result data and a plurality of torque command data taken at previous sampling times and the filter coefficients; and
  outputting the filtered result data to the machine as torque command data before the next sampling time.

7. Apparatus for suppressing mechanical resonance of a driven machine, comprising: drive means for driving a machine in accordance with command data applied thereto whereby the machine undergoes unwanted vibrations as a result of being driven; detecting means for detecting a change in at least one of the position, orientation and loading conditions of the driven machine and providing present condition data representative of the detected present condition of the machine; servo means responsive to the present condition data and to input command data representative of the desired movement of the machine for producing therefrom compensated command data effective to control the movement of the machine so that the machine moves in accordance with the input command data, the compensated command data having a frequency of vibration characteristic which includes the resonant frequency of the machine; and adaptive filter means for filtering the compensated command data to suppress frequency components near to and including the resonant frequency and applying the filtered compensated command data to the drive means to thereby suppress mechanical resonance of the driven machine.

8. An apparatus according to claim 7; wherein the adaptive filter means comprises a programmed logic device.

9. An apparatus according to claim 8; wherein the programmed logic device is programmed to have the characteristics of a notch filter whose notch frequency is adaptable to match the mechanical resonance frequency of the machine.

10. An apparatus according to claim 8; wherein the programmed logic device is programmed to have the characteristics of a low-pass filter whose cut-off frequency is adaptable to match the mechanical resonance frequency of the machine.

11. An apparatus according to claim 7; wherein the servo means comprises memory means for storing a processing program operative to calculate compensated command data from input command data and present condition data, and processing means for exvecuting the processing program.

12. An apparatus according to claim 11; wherein the adaptive filter means comprises a programmed logic device connected to receive the compensated command data and operative to calculate therefrom the filtered compensated command data under control of the processing means.

13. An apparatus according to claim 7; including, in combination therewith, a machine connected to be driven by the drive means.

14. A combination according to claim 13; wherein the machine comprises a robot having at least one movable arm.

15. A combination according to claim 13; wherein the machine comprises a machine tool.

16. A combination according to claim 13; wherein the machine comprises an X-Y table.

* * * * *